Patented Aug. 7, 1934

1,969,216

UNITED STATES PATENT OFFICE 1,969,216

ANTHRAQUINONE-ACRIDONE DERIVATIVES AND PROCESS OF PREPARING THE SAME

Ivan Gubelmann, South Milwaukee, and William Dettwyler, Milwaukee, Wis., assignors, by mesne assignments, to E. I. du Pont de Nemours & Company, a corporation of Delaware No Drawing. Application August 13, 1931, Serial No. 556,938

11 Claims. (Cl. 260—37)

This invention relates to novel organic compounds of the anthraquinone acridone series, and a process of preparing the same. It is an object of this invention to prepare novel anthrimide-acridone compounds in which the imide group and the heterocyclic ring are attached to different benzene nuclei of the same anthraquinone residue. We have found that anthrimide-acridone compounds of this type are capable of being used as dyestuffs by themselves and are further valuable as intermediates for other dyestuffs.

The novel compounds with which this invention deals in general possess the following nuclear structure:

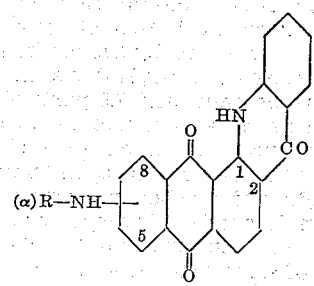

wherein R stands for a radical of the anthraquinone series which may be further substituted by imino-radicles, such as aroyl-imino or 1,2-benzacridonyl; while ($\alpha$) indicates that the group R—NH occupies either one of the positions 5 and 8 in the acridonyl-anthraquinone nucleus, the positions of the heterocyclic ring being designated as 1,2. Among the various possible residues represented by R, the following may be mentioned: anthraquinonyl, benzoyl-imino-anthraquinonyl, 1,2-benzacridonyl-anthraquinonyl, etc. Depending on the selection of R, therefore, our novel compounds may be illustrated by the following typical representatives:

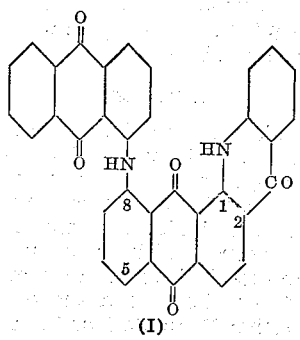

(I)

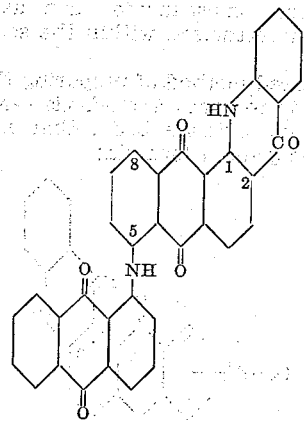

(II)

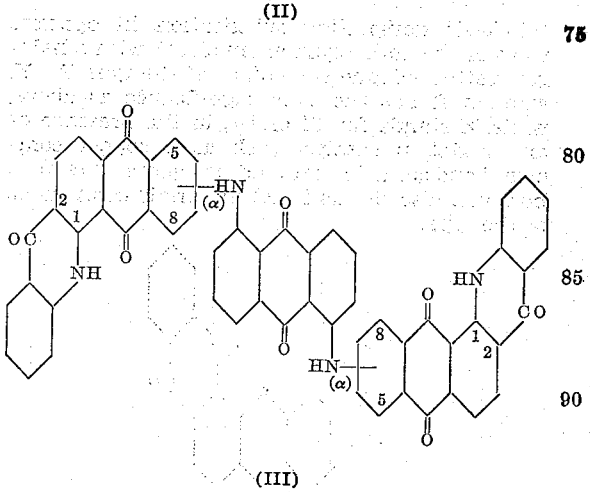

(III)

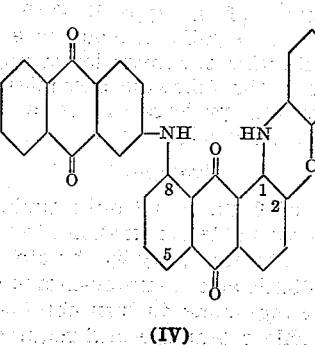

(IV)

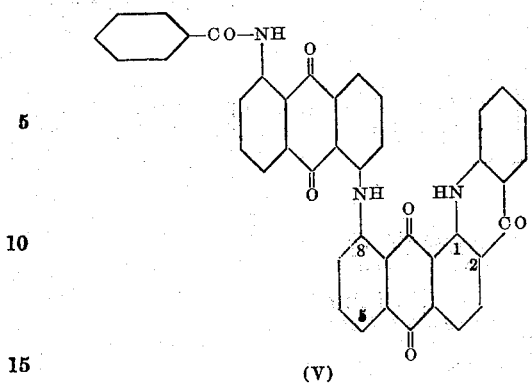

(V)

In either case the R—NH— residue may be attached either in position 5 or 8 of the 1,2-anthraquinone-acridone residue. In the above formulas no attempt has been made to represent simple nuclear substituents such as halogen, which are, nevertheless, within the scope of our invention.

Our preferred method of preparing these novel compounds is to react a vis-à-vis α-amino-1,2-anthraquinone-acridone body, that is, a compound of the general formula:

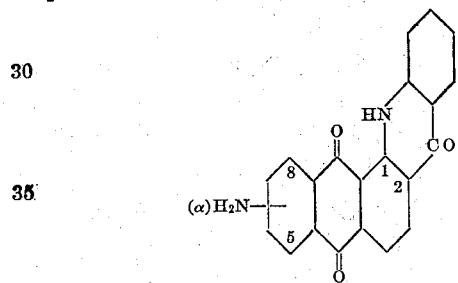

(vis-à-vis designating substitution in opposite rings of the anthraquinone nucleus) with a halogen anthraquinone compound of the type R—X, wherein R has the same significance as above, while X stands for Cl or Br, in the presence of an amidation catalyst such as a copper compound and suitable acid binding agents. We may, however, also use as inital materials compounds of the type:

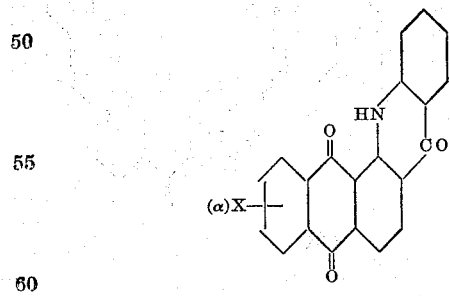

and condense the same with amino anthraquinone compounds of the type R—NH₂, R and X having the same significance as above.

Without limiting our invention to any particular procedure, the following examples are given to illustrate our preferred mode of operation. Parts given are parts by weight.

*Example 1*

10 parts of 8-amino-1,2-anthraquinone-benzacridone (obtainable for instance by ring-closing in known manner, say by the aid of sulfuric or chlorosulfonic acid, 8-amino-1-ortho-carboxyanilino-anthraquinone, in turn obtainable by reacting 1-chloro-8-amino-anthraquinone with anthranilic acid or a salt thereof by any suitable procedure, for instance by the method described in British Patent No. 312,678) are added to 100 parts of nitrobenzene, and 7.5 parts of α-chloro-anthraquinone, 4 parts of sodium carbonate and 0.8 parts of cuprous chloride are added. The mixture is heated to about 200 to 205° C. and stirred at this temperature for about 16 hours. It is now cooled and poured into 200 parts of water, and the nitrobenzene is distilled off by the aid of a steam jet. The residual mass is filtered hot, and the filter cake is washed with hot water until free of inorganic salts, dried and ground.

The product constitutes a dark violet powder; insoluble in water, dilute acids, or dilute alkalis. It is sparingly soluble in hot nitrobenzene, imparting thereto a purple color. It is readily soluble in concentrated sulfuric acid with a bright, brown color, but precipitates therefrom upon dilution with water in the form of violet flocks. It is readily soluble in the usual sodium-hydrosulfite vat with a violet color, from which cotton may be dyed in violet shades.

The product is most probably 8-α-anthraquinonyl-imino-1,2-anthraquinone benzacridone, corresponding in structure to Formula (I) above.

*Example 2*

10 parts of 5-amino-1,2-anthraquinone-benzacridone (obtainable, for instance, by ring closing in known manner, say by the aid of sulfuric or chlorosulfonic acid, 5-amino-1-ortho-carboxyanilino-anthraquinone, in turn obtainable by reacting 1-chloro-5-amino-anthraquinone with anthranilic acid or a salt thereof by any suitable procedure, for instance, by the method described in British Patent No. 312,678) are added to 100 parts of nitrobenzene, and 7.5 parts of α-chloro-anthraquinone, 4 parts of sodium carbonate and 0.8 parts of cuprous chloride are added. The rest of the procedure is the same as in Example 1.

The product is similar in properties to that obtained in Example 1, except that the colors of the various solutions and the dyeings upon cotton are of somewhat redder shade. It is most probably 5-α-anthraquinonylimino-1,2-anthraquinone-benzacridone, corresponding in structure to Formula (II) above.

*Example 3*

10 parts of 8-amino-1,2-anthraquinone-benzacridone are dissolved in 100 parts of nitrobenzene and into this solution there are added 4.5 parts of 1,5-dichloro-anthraquinone, 4 parts of sodium carbonate, and 0.8 parts of cuprous chloride. The rest of the procedure is the same as in Example 1.

The product is similar in properties to that of Example 1, except that its dyeing upon cotton is somewhat more bluish. It is most probably 1,5-bis (1,2-benzacridonyl-8-anthraquinonylimino)-anthraquinone corresponding in structure to Formula (III) above.

*Example 4*

The procedure is the same as in Example 1, except that in lieu of 7 parts of α-chloro-anthraquinone therein specified, an equal weight of β-chloro-anthraquinone is herein used.

The product is similar in properties to that of Example 1, except that its color in sulfuric acid is yellow, and its dyeings upon cotton are a more bluish shade of violet than the dyeings of the product of either Example 1 or Example 3. It is most probably 8-β-anthraquinonylimino-1,2-anthraquinone-benzacridone, corresponding in structure to Formula (IV) above.

Example 5

The procedure is the same as in Example 1, except that in lieu of 7 parts of α-chloro-anthraquinone therein specified, 11 parts of 1-chloro-5-benzoylamino-anthraquinone are herein used.

The product is a dark powder; insoluble in water, dilute acids, or dilute alkalis. It is somewhat soluble in hot nitrobenzene, imparting thereto a claret red coloration. It is readily soluble in concentrated sulfuric acid with a red-brown color, but precipitates therefrom upon dilution with water in the form of violet flocks. It dissolves readily in the usual hydrosulfite vat with a violet color, from which cotton is dyed a violet shade.

The product is most probably 8-(5'-benzoylamino-1'-anthraquinonylimino)-1,2-anthraquinone-benzacridone, corresponding in structure to Formula (V) above.

The products obtained in the aforegoing examples may be halogenated, if desired, to produce the corresponding halogen derivatives.

Example 6

10 grams of the dry, pulverized condensation product obtained in Example 3 were suspended in 100 parts of nitrobenzene. 0.1 part of iodine was added and the mixture was heated to 100° C. Chlorine gas was passed in slowly for two hours. The mass was poured into 200 grams of water and steam-distilled with a jet of steam until free of nitrobenzene. The residual mass was filtered and the filter cake was washed with hot water, dried and ground.

The product was a dark violet powder, insoluble in water, dilute acids and dilute alkalis. It is soluble in hot nitrobenzene with a violet coloration. It dissolves readily in concentrated sulfuric acid, imparting thereto a dull red color, but precipitates therefrom upon dilution with water in the form of reddish-violet flocks. It is readily soluble in the usual sodium-hydrosulfite vat with a violet color, and dyes cotton therefrom in reddish violet shades considerably redder than the initial material.

Its chlorine content is 35.7%.

It will be understood that many variations are possible in the procedures above set forth without departing from the spirit of this invention. For instance, instead of the chloro-derivatives of the anthraquinones above mentioned, the corresponding bromo-derivatives may be used. Homologous or otherwise substituted anthraquinone bodies may be used. Instead of starting with a halogen-anthraquinone body and an amino-anthraquinone-acridone body, one may select the corresponding amino-anthraquinone and halogen-anthraquinone-acridone bodies. Many other variations are possible, as will be readily understood to those skilled in the art.

In the above disclosure it should be understood that wherever we are referring to the dyeing of cotton, we imply of course, the usual procedure of dyeing with vat dyestuffs, involving at the end an aeration or oxidation of the dyed material.

In the claims below it should be understood that where new products, dyestuffs, or articles of manufacture are claimed, we mean to include these bodies not only in substance, but also in whatever state they exist when applied to material dyed, printed, or pigmented therewith.

We claim:

1. An anthrimide-acridone compound possessing the following nuclear structure:

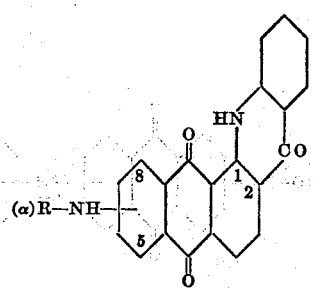

wherein R stands for a radical of the anthraquinone series, while (α) indicates that the NH group is attached to one of the positions 5 and 8.

2. An anthrimide-acridone compound having the following general formula:

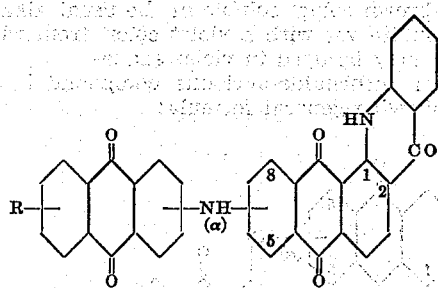

wherein R stands for a hydrogen atom, an aroylimino group of the benzene series, or a radical of the type

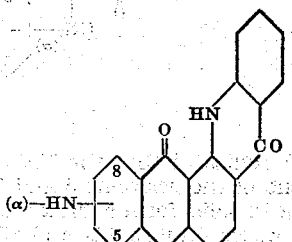

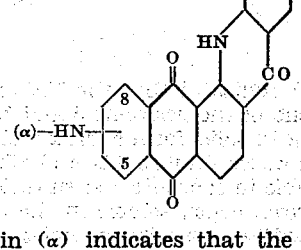

and wherein (α) indicates that the NH group is attached to one of the positions 5 and 8.

3. An anthrimide-acridone compound having the following general formula:

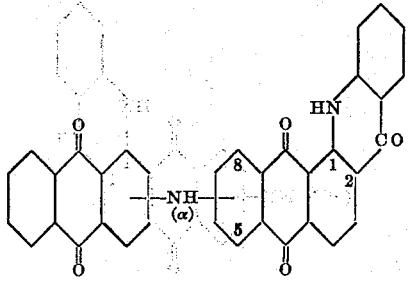

wherein (α) indicates that the NH group is attached to one of the positions 5 and 8, said compound being in solid form a dark-violet powder; insoluble in water, dilute acids, and dilute alkalis; readily soluble in concentrated sulfuric acid with a bright brown color; soluble in the usual alkaline hydrosulfite vat with a violet color, from which cotton may be dyed in violet shades.

4. An anthrimide-acridone compound having the following general formula:

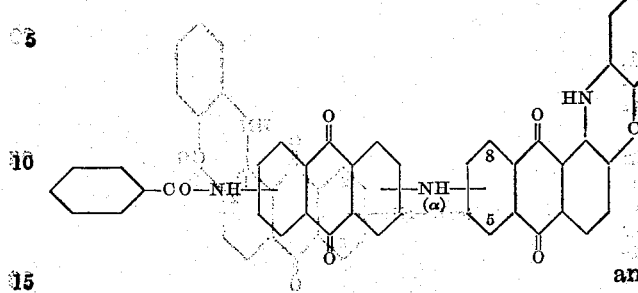

wherein (α) indicates that the NH group is attached to one of the positions 5 and 8, said compound being in solid form a dark powder; insoluble in water, dilute acids, and dilute alkalis; readily soluble in concentrated sulfuric acid with a red-brown color; soluble in the usual alkaline hydrosulfite vat with a violet color, from which cotton may be dyed in violet shades.

5. An anthrimide-acridone compound having the following general formula:

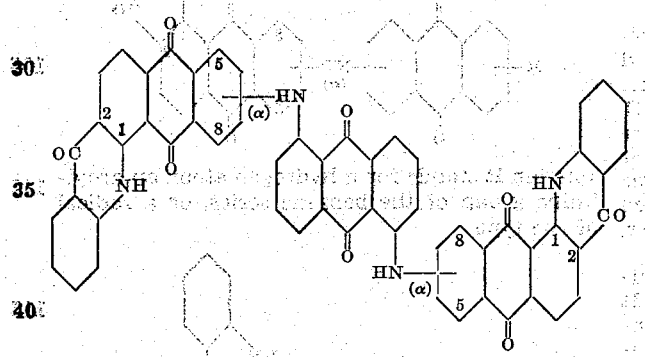

wherein (α) indicates that the NH group is attached to one of the positions 5 and 8, said compound being in solid form a dark violet powder; insoluble in water, dilute acids, and dilute alkalis; readily soluble in concentrated sulfuric acid with a bright brown color; soluble in the usual alkaline hydrosulfite vat with a violet color, from which cotton may be dyed in violet shades.

6. An anthrimide-acridone compound possessing the following nuclear structure:

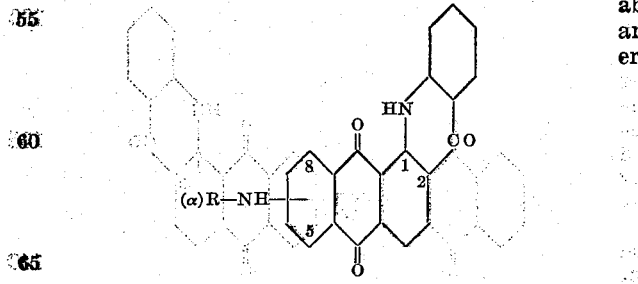

wherein R stands for a radical of the anthraquinone series which may be further substituted by an aroyl-imino group of the benzene series or by a benzacridone ring, while (α) indicates that the NH group is attached to one of the positions 5 and 8.

7. The process of producing an anthrimide-acridone compound, which comprises heating in an inert organic liquid in the presence of an acid absorbing agent and a condensing catalyst a 1,2-anthraquinone-acridone compound of the general formula:

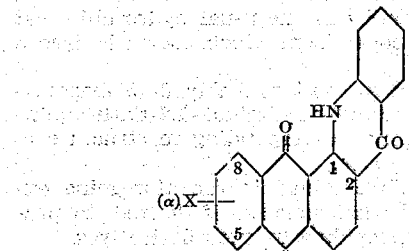

and an anthraquinone body of the general formula R—Y, wherein R stands for a radical of the anthraquinone series, one of the members X and Y stands for halogen while the other stands for an amino group, and wherein (α) indicates that the member X is attached to one of the positions 5 and 8.

8. The process of producing an anthrimide-acridone compound, which comprises heating in an inert organic liquid in the presence of an acid absorbing agent and a condensing catalyst a 1,2-anthraquinone-acridone compound of the general formula:

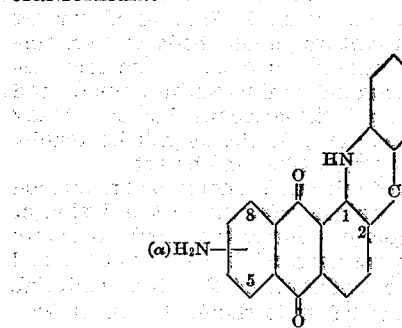

and an anthraquinone body of the formula R—Y, wherein R stands for a radical of the anthraquinone series, Y stands for Cl or Br, while (α) indicates that the group H₂N— is attached to one of the positions 5 and 8.

9. The process of producing an anthrimide-acridone compound, which comprises heating in an inert organic liquid in the presence of an acid absorbing agent and a condensing catalyst a 1,2-anthraquinone-acridone compound of the general formula:

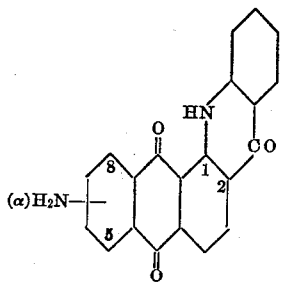

and a chloro-anthraquinone body of the formula:

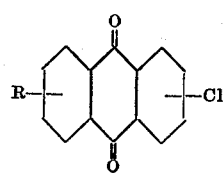

wherein R stands for a hydrogen atom, a chlorine atom, or a benzoyl-amino group.

10. The process of producing an anthrimide-acridone compound, which comprises heating in an inert organic liquid in the presence of an acid absorbing agent and a condensing catalyst a 1,2-anthraquinone-acridone compound of the general formula:

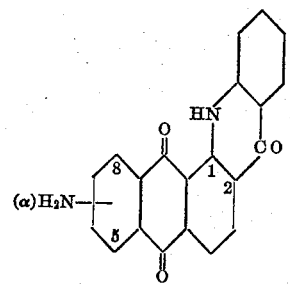

wherein (α) indicates that the H₂N group is attached to one of the positions 5 and 8, and a chloro-anthraquinone.

11. The process of producing an anthrimide-acridone compound, which comprises heating in an inert organic liquid in the presence of an acid absorbing agent and a condensing catalyst a 1,2-anthraquinone-acridone compound of the general formula:

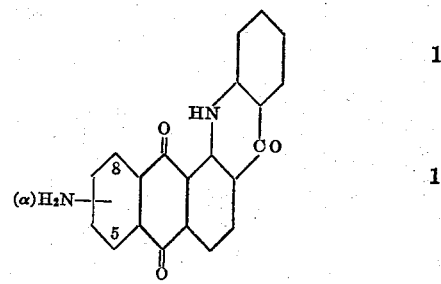

wherein (α) indicates that the H₂N group is attached to one of the positions 5 and 8, and 1,5-dichloro-anthraquinone.

IVAN GUBELMANN.
WILLIAM DETTWYLER.